United States Patent
Nagao et al.

(10) Patent No.: US 6,683,436 B2
(45) Date of Patent: Jan. 27, 2004

(54) SELF-STARTING MOTOR CONTROL DEVICE AND METHOD FOR ENGINE

(75) Inventors: Takashi Nagao, Kumamoto (JP); Yuji Eto, Kumamoto (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/907,661

(22) Filed: Jul. 19, 2001

(65) Prior Publication Data

US 2002/0008494 A1 Jan. 24, 2002

(30) Foreign Application Priority Data

Jul. 19, 2000 (JP) ......................................... 2000-218550

(51) Int. Cl.[7] ............................................... H02P 1/26
(52) U.S. Cl. ..................... 318/778; 318/90; 370/516; 370/527
(58) Field of Search ................ 318/90, 778; 340/516, 340/527

(56) References Cited

U.S. PATENT DOCUMENTS

| 2,952,782 | A | * | 9/1960 | Woyden | ................... | 290/37 A |
|---|---|---|---|---|---|---|
| 2,975,296 | A | * | 3/1961 | Domingues-Rego | ...... | 290/37 A |
| 5,788,005 | A | * | 8/1998 | Arai | ............................. | 180/247 |
| 5,942,988 | A | | 8/1999 | Snyder et al. | .......... | 340/825.69 |
| 5,967,106 | A | | 10/1999 | Schulze et al. | ........... | 123/179.3 |
| 6,155,956 | A | * | 12/2000 | Hayashi | ..................... | 192/12 R |
| 6,247,437 | B1 | * | 6/2001 | Yamaguchi et al. | ..... | 123/179.3 |
| 6,435,296 | B1 | * | 8/2002 | Arai | ........................... | 180/243 |

FOREIGN PATENT DOCUMENTS

| DE | 43 41 279 A1 | | 6/1995 | | |
|---|---|---|---|---|---|
| DE | 195 03 537 A1 | | 8/1996 | | |
| JP | 363 173 848 | * | 7/1988 | ........... | F02N/11/08 |
| JP | 363 178 703 | * | 7/1988 | ........... | B60L/13/00 |
| JP | 363 186 963 | * | 8/1988 | ........... | F02N/11/08 |

* cited by examiner

*Primary Examiner*—Rita Leykin
(74) *Attorney, Agent, or Firm*—Birch, Stewart, Kolasch & Birch, LLP

(57) ABSTRACT

A control device for driving a self-starting motor for an engine is provided with a control means 4. If a starting switch 7 is switched ON when a start enabling signal of a start limiting means 5 and a non-start signal of a start detecting means 6 are in an output condition, the control means 4 puts a starting relay 3 which supplies a starting motor 1 with electricity in the ON-state for a predetermined time, only when the start enabling signal and the non-start signal are in the output condition.

7 Claims, 3 Drawing Sheets

COMPARATIVE ART

SELF-STARTING MOTOR CONTROL DEVICE AND METHOD FOR ENGINE

BACKGROUND OF THE INVENTION

1. Field of the Invention

The present invention relates to a self-starting motor control device and method for operating a motor which starts an engine with a self-starter mounted.

2. Description of the Prior Art

A conventional self-starting motor control device for an engine is shown in FIG. 4. When a starting switch 101 is depressed to ON after a main switch 100 is switched ON, a contact point 102a of a starting relay 102 is switched ON and a starting motor 103 is caused to rotate while the starting switch 101 is depressed. A reference numeral 104 is a battery and a numeral 105 is a fuse.

A condition for exciting the starting relay 102 is an ON/OFF state of the starting switch 101. In addition to the ON/OFF state of the starting switch 101, an ON/OFF state such as that of a brake switch or a gear position switch may be connected with the starting switch 101 in series as a starting condition.

However, according to the prior art, the starting switch 101 must be turned ON, in other words, it must be continuously depressed until an engine starts. Accordingly, the depressing time varies with each operator and there is some possibility that the engine will not start depending on the pressing time.

Further, if the starting switch 101 is switched ON or the ON-state is left as is, though the engine has started, the starting motor 103 rotates or continues to rotate. Accordingly, there is some possibility that electricity is wasted so as to shorten the life of the battery 104.

SUMMARY OF THE INVENTION

It is therefore an object of the present invention to solve those disadvantages and to provide a self-starting motor control device and method for an engine which can start the engine dependably by making its starting operation easier.

To solve the above-mentioned disadvantages, according to the present invention, a control device for driving a self-starting motor for an engine comprises a control means, wherein if a starting switch is switched ON when a start enabling signal of a start limiting means and a non-start signal of a start detecting means are in an output state, the control means puts a starting relay which supplies a starting motor with electricity in an ON-state for a predetermined time, only when the start enabling signal and the non-start signal are in the output state.

In the self-starting motor control device, the control means comprises a determination circuit for outputting an operating signal when all of an ON-signal of the starting switch, the start enabling signal of the start limiting means, and the non-start signal of the start detecting means are in the output state, a timer circuit for outputting a signal for a predetermined time by the operating signal of the determination circuit, and a relay driving circuit for outputting an exciting signal to an exciting coil of the starting relay when the operating signal of the determination circuit and an output signal of the timer circuit are in the output state.

The timer circuit outputs an ON/OFF signal when all of the ON-signal of the starting switch, the start enabling signal of the start limiting means, and the non-start signal of the start detecting means continue to maintain the output state.

According to another invention, a control method is provided for driving a self-starting motor for an engine, in which if a starting switch is switched ON when a start enabling signal of a start limiting means and a non-start signal of a start detecting means are in an output state, a starting relay which supplies a starting motor with electricity is switched ON for a predetermined time, only when the start enabling signal and the non-start signal are in an output state.

The above and other objects, features and advantages of the present invention will become more apparent from the following description when taken in conjunction with the accompanying drawings.

DETAILED DESCRIPTION OF THE PREFERRED EMBODIMENTS

Figure 1:
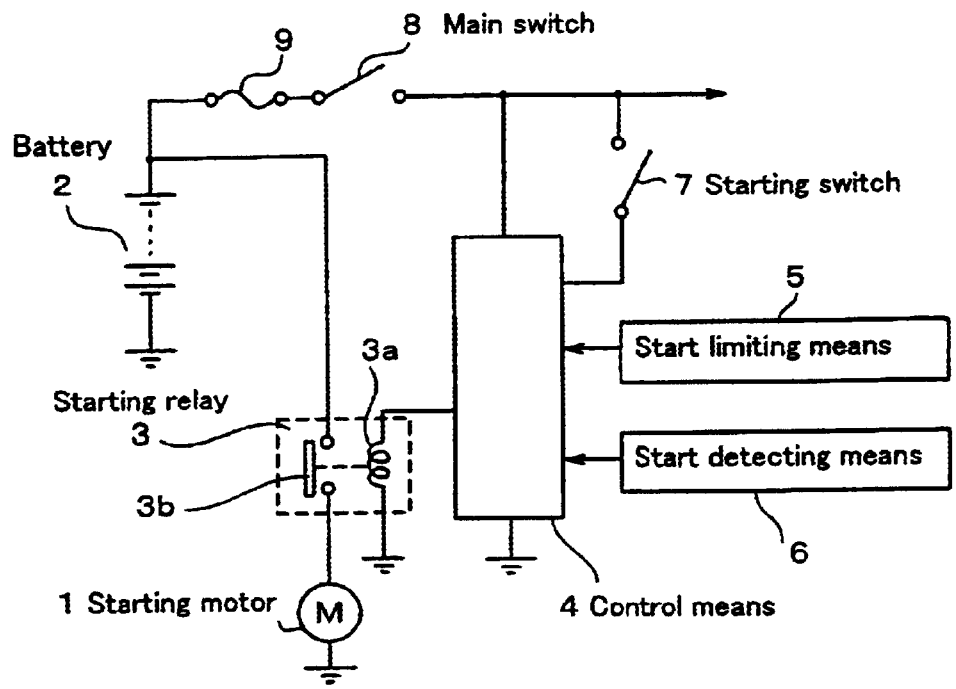
FIG. 1 is a schematic diagram of a self-starting motor control device for an engine according to the present invention.

Preferred embodiments of the present invention will now be described with reference to the accompanying drawings. FIG. 1 is a schematic diagram of a self-starting motor control device for an engine according to the present invention, FIG. 2 is a schematic diagram of a control means, and FIG. 3 is a timing chart.

A self-starting motor control device for an engine according to the present invention comprises, as shown in FIG. 1, a starting relay 3 for supplying a starting motor 1 with electricity from a battery 2, a control means 4 for putting the starting relay 3 in an ON-state for only a predetermined time, a start limiting means 5 for outputting a start enabling signal to the control means 4, a start detecting means 6 for outputting a non-start signal to the control means 4, and a starting switch 7 which is operated by an operator.

Further, the starting relay 3 comprises an exciting coil 3a which is excited by an output signal of the control means 4, and a normal open contact 3b which is switched ON when the exciting coil 3a is excited. A reference numeral 8 is a main switch and a numeral 9 is a fuse.

Figure 2:
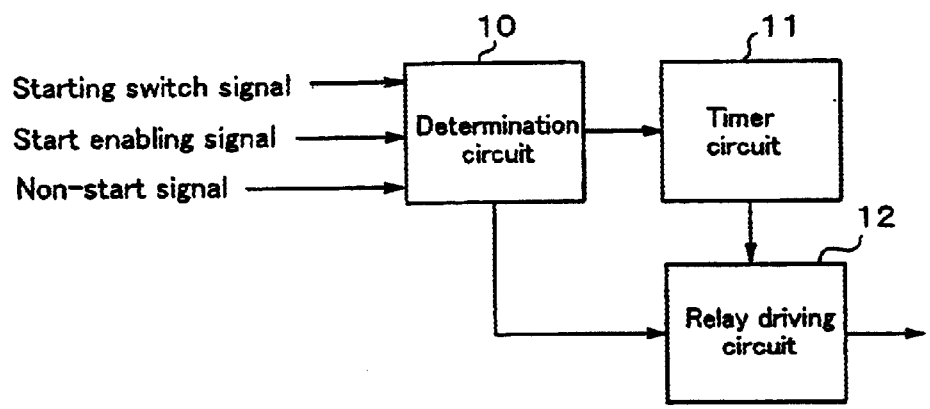
FIG. 2 is a schematic diagram of a control means.
Figure 3:
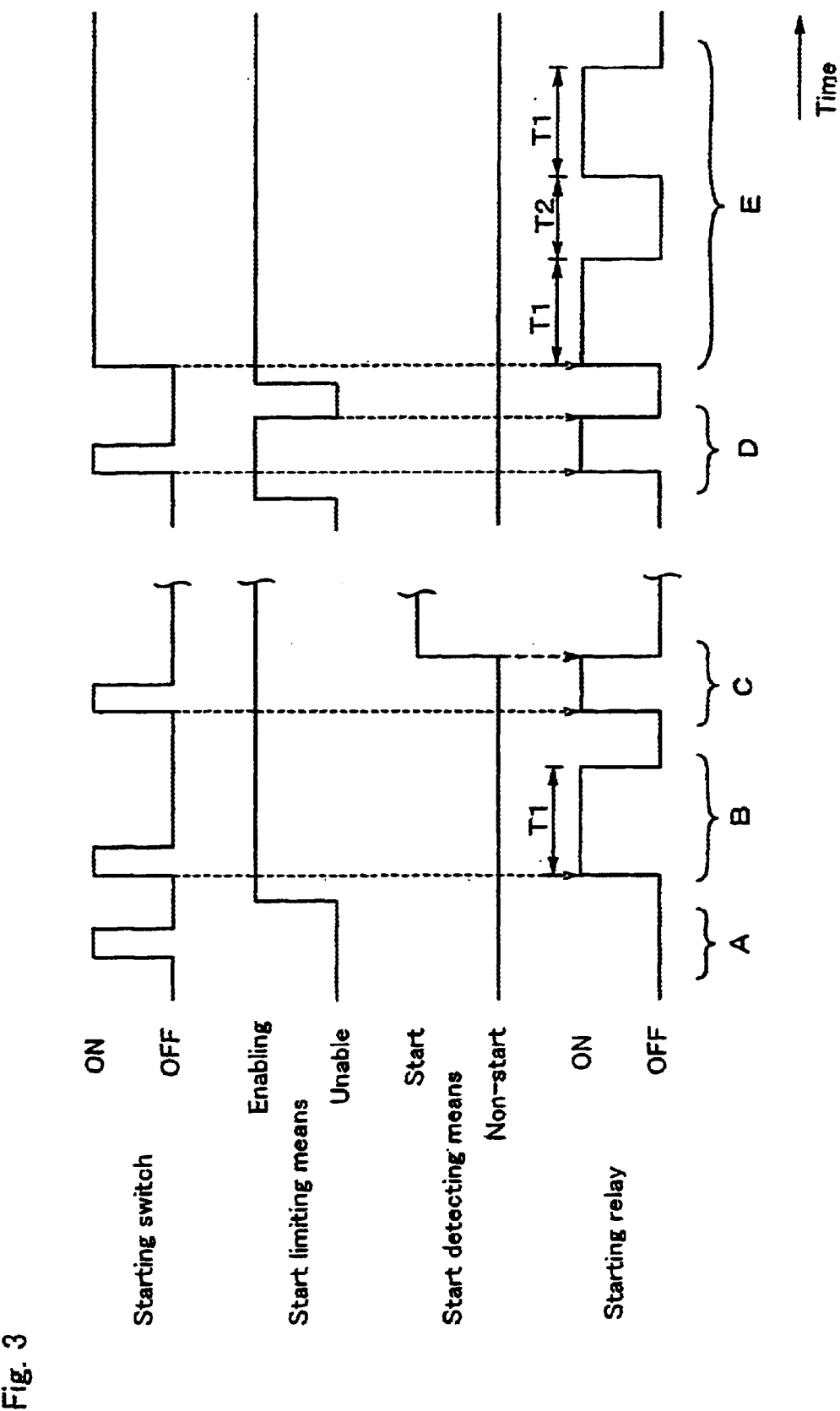
FIG. 3 is a timing chart.
Figure 4:
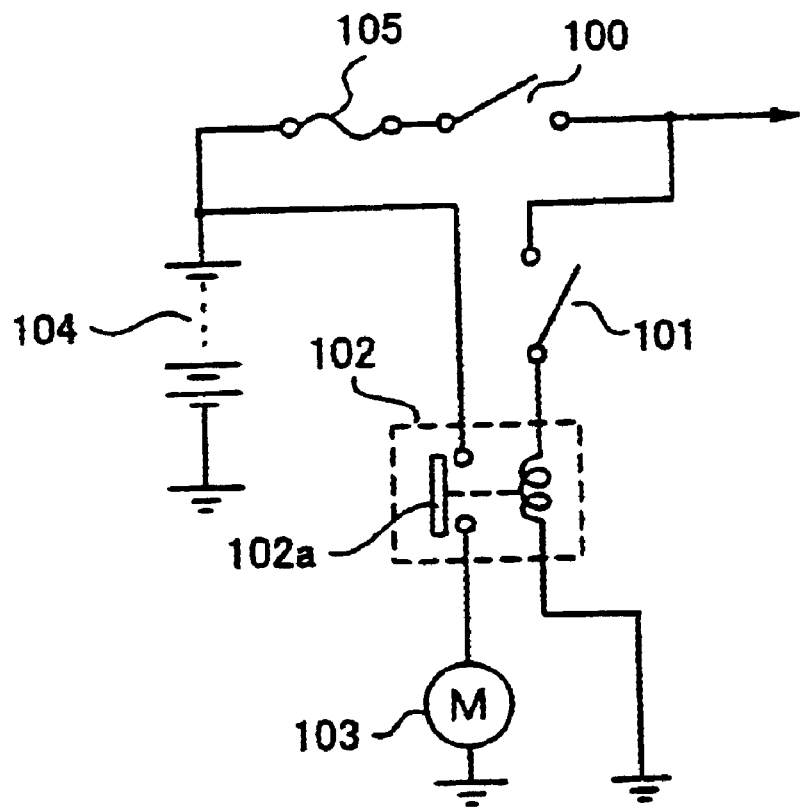
FIG. 4 is a schematic diagram of a conventional self-starting motor control device for an engine.

Still further, the control means 4 comprises, as shown in FIG. 2, a determination circuit 10 for outputting an operating signal when an ON-signal of the starting switch 7, the start enabling signal of the start limiting means 5, and the non-start signal of the start detecting means 6 are all in an output state, a timer circuit 11 for outputting an ON-signal for only a predetermined time T1, being started by the operating signal of the determination circuit 10, and a relay driving circuit 12 for outputting an exciting current to the exciting coil 3a of the starting relay 3 when the operating signal of the determination circuit 10 and the ON-signal of the timer circuit 11 are in the output state.

An ON-signal from a device such as a brake switch or a gear position switch is considered as the start enabling signal of the start limiting means 5.

The non-start signal of the start detecting means 6 may be generated by converting to an engine speed of the engine using a rotating pulse signal or an ignition signal of the engine, or a detection signal of a sensor which detects more than an idling engine speed may be used as the non-start signal.

When all of the ON-signal of the starting switch 7, the start enabling signal of the start limiting means 5, and the non-start signal of the start detecting means 6 pass a first ON-time T1 and continue to maintain the output state, the timer circuit 11 reaches an OFF-time T2 after passing the first ON-time T1 and reaches an ON-time T1 again. This is then repeated.

An operation of the self-starting motor control device and method for operating an engine as constructed above will be described with reference to the timing chart shown in FIG. 3. Main operating situations in starting are classified into five cases, (A) to (E), for clarification.

A first case (A) is the case where the starting switch 7 is depressed to put the starting switch 7 in an ON-state in such a condition that either one or both of the start enabling signal of the start limiting means 5 and the non-start signal of the start detecting means 6 are not output in the determination circuit 10. Since the three conditions for starting (i.e. the start enabling signal, the non-start signal, and the ON-signal of the starting switch 7) are not met, the operating signal is not output from the determination circuit 10 to the timer circuit 11 and the relay driving circuit 12 and as a result, an exciting current is not output from the relay driving circuit 12 to the exciting coil 3a of the starting relay 3.

Accordingly, the contact 3b of the starting relay 3 is not switched ON and the electricity is not supplied from the battery 2 to the starting motor 1. As a result, the starting motor 1 does not rotate.

A second case (B) is the case where the starting switch 7 is depressed to put the starting switch 7 in the ON-state in such a condition that each of the start enabling signal of the start limiting means 5 and the non-start signal of the start detecting means 6 is output to the determination circuit 10. Since the three conditions for starting are met, the operating signal is output from the determination circuit 10 to the timer circuit 11 and the relay driving circuit 12, and the exciting current is output for only a predetermined time T1 from the relay driving circuit 12 to the exciting coil 3a of the starting relay 3. It is to be noted that the length of time that the starting switch 7 is switched ON is not a question here.

Accordingly, the contact 3b of the starting relay 3 is switched ON for only a predetermined time T1 and the electricity from the battery 2 is supplied to the starting motor 1, wherein the starting motor 1 rotates for only a predetermined time T1. The second case (B) shows a case that even though the starting motor 1 rotates beyond the predetermined time T1, the start of the engine cannot be confirmed by the start detecting means 6.

A third case (C) is the case where the three conditions for starting are met as in the second case (B) and the operating signal is output from the determination circuit 10 to the timer circuit 11 and the relay driving circuit 12, and as a result, the exciting current is output from the relay driving circuit 12 to the exciting coil 3a of the starting relay 3 to put the contact 3b in the ON-state, wherein the start of the engine is confirmed by the start detecting means 6 within a predetermined time T1 after the starting motor 1 has started to rotate.

Accordingly, starting the engine allows the start detecting means 6 to output the start signal. Thus, the operating signal is not output from the determination circuit 10 and the exciting current is not output from the relay driving circuit 12 to the exciting coil 3a of the starting relay 3. As a result, the contact 3b of the starting relay 3 is switched OFF to stop supply of electricity from the battery 2 to the starting motor 1. This is because once the start of the engine is confirmed, it is no longer necessary to supply electricity from the battery 2 to the starting motor 1.

A fourth case (D) is the case where the three conditions for starting are met, as in the second case (B), and the operating signal is output from the determination circuit 10 to the timer circuit 11 and the relay driving circuit 12. As a result, the exciting current is output from the relay driving circuit 12 to the exciting coil 3a of the starting relay 3 to put the contact 3b in the ON-state, wherein the start enabling signal is not output from the start limiting means 5 within a predetermined time T1 after the starting motor 1 has started to rotate.

Accordingly, when the start enabling signal is not output from the start limiting means 5, the operating signal is neither output from the determination circuit 10, nor is the exciting current output from the relay driving circuit 12 to the exciting coil 3a of the starting relay 3. As a result, the contact 3b of the starting relay 3 is switched OFF and the electricity from the battery 2 is not supplied to the starting motor 1. This is because it is not desirable to start the engine in such a condition in which the start enabling signal is not output form the start limiting means 5.

A fifth case (E) is the case where although the starting switch 7 is depressed to put the starting switch 7 in the ON-state when the start enabling signal of the start limiting means 5 and the non-start signal of the start detecting means 6 maintain the output state, the starting motor 1 does not rotate and therefore the starting switch 7 is continuously depressed even after a predetermined time T1 has passed.

Since the three conditions for starting are met, the operating signal is output from the determination circuit 10 to the timer circuit 11 and the relay driving circuit 12, and the exciting current is output for only a predetermined time T1 from the relay driving circuit 12 to the exciting coil 3a of the starting relay 3.

The exciting current is not output from the relay driving circuit 12 to the exciting coil 3a of the starting relay 3 immediately after the predetermined time T1 has passed. However, the exciting current is output again for only a predetermined time T1 after the predetermined time T1 has elapsed and after stand-by for only a predetermined time T2. As a result, the starting relay 3 is switched ON and electricity is supplied from the battery 2 to the starting motor 1.

If such a situation continues, the starting relay 3 is operated to repeat the ON (T1)/OFF (T2) states by the timer circuit 11. In this manner, it is possible to prevent a fault in the starting motor 1 and to prevent shortening the life of the battery 2.

The starting switch 7 is described as an essential constituent requirement in the present invention. However, if the ON-signal such as that from a brake switch or a gear position switch for the start enabling signal of the start limiting means 5 is considered as the ON-signal of the starting switch 7, it is also possible to remove the starting switch 7.

Further, since the starting signal which acts against the non-start signal of the start detecting means 6 is closely connected with an ignition device, the control means 4 can be added to the inside of the ignition device.

As described above, according to the invention, if the starting switch is operated to put the starting switch in the ON-state, the starting motor can be driven for a predetermined time in spite of the length of operating time of the starting switch. Accordingly, it is possible to obtain stable starting characteristics for an engine.

Further, since the starting motor is not driven unless the start enabling signal of the start limiting means and the non-start signal of the start detecting means are in the output state, it is possible to prevent a fault in the starting motor and to prevent shortening the life of the battery.

The control device of the self-starting motor for an engine which can obtain stable starting characteristics for the engine can be made simple.

Since electricity is supplied from the battery to the starting motor for only a predetermined time at certain time intervals, even though the starting switch is continuously depressed in such a condition that the start of the engine is not confirmed, it is possible to prevent a fault in the starting motor and to prevent shortening the life of the battery.

Since the starting motor can be driven for a predetermined time in spite of the length of operating time of the starting switch if the starting switch is operated to put the starting switch in the ON-state, it is possible to obtain stable starting characteristics for the engine.

Further, since the starting motor is not driven unless the start enabling signal of the start limiting means and the non-start signal of the start detecting means are in the output state, it is possible to prevent a fault in the starting motor and to prevent shortening the life of the battery.

What is claimed is:

1. A self starting motor control device for an engine which drives a self-starting motor when the engine is started, comprising:

control means, wherein if a brake switch is switched ON when a start enabling signal of a start limiting means and a non-start signal of a start detecting means are in an output state, the control means puts a starting relay which supplies the motor with electricity in the ON-state for a first predetermined time, only when the start enabling signal and the non-start signal are in the output state, and wherein the control means outputs alternating ON/OFF signals, when all of an ON-signal of the brake switch, the start enabling signal of the start limiting means, and the non-start signal of the start detecting means continue in the output state, and wherein the ON signal is outputted for said first predetermined time, and the OFF signal is outputted for a second predetermined time.

2. The self-starting motor control device for an engine according to claim 1, wherein the control means includes:

a determination circuit for outputting an operating signal when said ON-signal of the brake switch, the start enabling signal of the start limiting means, and the non-start signal of the start detecting means are all in the output state;

a timer circuit for outputting a signal for only a predetermined time by the operating signal of the determination circuit; and a relay driving circuit for outputting an exciting signal to an exciting coil of the starting relay when the operating signal of the determination circuit and the output signal of the timer circuit are in the output state.

3. The self-starting motor control device for an engine according to claim 2, wherein the timer circuit outputs said ON/OFF signals when all of the ON-signal of the brake switch, the start enabling signal of the start limiting means, and the non-start signal of the start detecting means continue to maintain the output state.

4. A self-starting motor control method for a engine which drives the a self-starting motor when the engine is started, comprising the steps of:

switching ON a starting relay which supplies said motor with electricity for a first predetermined time, when all of an ON-signal of the brake switch, a start enabling signal of a start limiting means, and a non-start signal of a start detecting means are in an output state; and outputting alternative ON/OFF signals when all of said ON-signal of the brake switch, the start enabling signal of the start limiting means, and the non-start signal of the start detecting means continue to be maintained in the output state, the ON signal being outputted for said first predetermined time, and the OFF signal being outputted for a second predetermined time.

5. A self starting motor control device for an engine which drives a self-starting motor when the engine is started, comprising:

control means, wherein if a gear position switch is switched ON when a start enabling signal of a start limiting means and a non-start signal of a start detecting means are in an output state, the control means puts a starting relay which supplies the motor with electricity in the ON-state for a first predetermined time, only when the start enabling signal and the non-start signal are in the output state, and wherein the control means outputs alternating ON/OFF signals, when all of an ON-signal of the gear position switch, the start enabling signal of the start limiting means, and the non-start signal of the start detecting means continue in the output state, and wherein the ON signal is outputted for said first predetermined time, and the OFF signal is outputted for a second predetermined time.

6. The self-starting motor control device for an engine according to claim 1, wherein the control means includes:

a determination circuit for outputting an operating signal when said ON-signal of the gear position switch, the start enabling signal of the start limiting means, and the non-start signal of the start detecting means are all in the output states;

a timer circuit for outputting a signal for only a predetermined time by the operating signal of the determination circuit; and a relay driving circuit for outputting an exciting signal to an exciting coil of the starting relay when the operating signal of the determination circuit and the output signal of the timer circuit are in the output state.

7. The self-starting motor control device for an engine according to claim 2, wherein the timer circuit outputs said ON/OFF signals when all of the ON-signal of the gear position switch, the start enabling signal of the start limiting means, and the non-start signal of the start detecting means continue to maintain the output state.

* * * * *